(12) United States Patent
Selle

(10) Patent No.: US 8,459,920 B2
(45) Date of Patent: Jun. 11, 2013

(54) FASTENER

(75) Inventor: Stephen Selle, Mentor, OH (US)

(73) Assignee: Stafast Products, Inc., Painesville, OH (US)

(\*) Notice: Subject to any disclaimer, the term of this patent is extended or adjusted under 35 U.S.C. 154(b) by 854 days.

(21) Appl. No.: 12/363,754

(22) Filed: Jan. 31, 2009

(65) Prior Publication Data

US 2010/0196091 A1    Aug. 5, 2010

(51) Int. Cl.
*F16B 19/00*    (2006.01)

(52) U.S. Cl.
USPC ............. 411/510; 411/508; 411/509; 24/453

(58) Field of Classification Search
USPC .... 411/188, 508, 510, 908, 509, 913; 24/297, 24/453
See application file for complete search history.

(56) References Cited

U.S. PATENT DOCUMENTS

| | | | |
|---|---|---|---|
| 180,064 A | 7/1876 | Rebasz | |
| 1,893,067 A | 1/1933 | Arenz | |
| 2,321,497 A | 8/1939 | Luce | |
| 3,358,727 A | 12/1967 | Hughes | |
| 3,810,279 A * | 5/1974 | Swick et al. | 411/509 |
| 4,318,208 A * | 3/1982 | Borja et al. | 24/305 |
| D268,894 S * | 5/1983 | Wollar | D8/385 |
| 4,396,329 A * | 8/1983 | Wollar | 411/508 |
| 4,402,641 A * | 9/1983 | Arff | 411/510 |
| 4,422,276 A * | 12/1983 | Paravano | 52/511 |
| 4,427,328 A * | 1/1984 | Kojima | 411/508 |
| 4,508,478 A | 4/1985 | Leistner | |
| 4,568,215 A * | 2/1986 | Nelson | 403/13 |
| 4,728,238 A * | 3/1988 | Chisholm et al. | 411/510 |
| 4,776,739 A * | 10/1988 | Hamman | 411/510 |
| 4,840,523 A * | 6/1989 | Oshida | 411/48 |
| 4,936,530 A * | 6/1990 | Wollar | 248/71 |
| 4,938,645 A * | 7/1990 | Wollar | 411/508 |
| 5,007,779 A * | 4/1991 | Goran | 411/48 |
| 5,039,267 A * | 8/1991 | Wollar | 411/508 |
| 5,152,582 A | 10/1992 | Magnuson | |
| 5,195,854 A | 3/1993 | Nagayama | |
| 5,199,836 A | 4/1993 | Gogarty | |
| 5,232,322 A * | 8/1993 | Regensburger | 411/33 |

(Continued)

OTHER PUBLICATIONS

U.S. Appl. No. 61/089,859, filed Aug. 18, 2008, Selle.

(Continued)

*Primary Examiner* — Victor Batson
*Assistant Examiner* — Tyler Johnson
(74) *Attorney, Agent, or Firm* — Woodling, Krost and Rust

(57) ABSTRACT

A integrally molded fastener for use in connection with a substrate, the substrate includes foam backing and a slot therein and the substrate includes a front side and a back side. An upper plate has first and second longitudinal tabs and first and second transverse tabs. A longitudinal head is interconnected with an upper plate by a shank. A shaft extends from the upper plate and branches extend from the shaft. The longitudinal head includes cutting edges, the fastener and the longitudinal head are rotatable and, cutting edges of the longitudinal head cut the foam backing of the substrate as the fastener and the longitudinal head are rotated. A method for using the integrally molded fastener which includes engaging, slidingly, the side wall portions proximate the wider portion of the longitudinal tabs with the walls of the slot first. Riding the side wall portions of the longitudinal tabs on the front side of said substrate and as rotation of the fastener and the longitudinal tabs continues.

5 Claims, 13 Drawing Sheets

U.S. PATENT DOCUMENTS

| | | |
|---|---|---|
| 5,238,344 A | 8/1993 | Nagayama |
| 5,306,098 A * | 4/1994 | Lewis ............................ 411/510 |
| 5,348,432 A | 9/1994 | Nagayama |
| 5,391,031 A | 2/1995 | Medal |
| 5,429,466 A | 7/1995 | Nagayama |
| 5,501,558 A | 3/1996 | Figge |
| 5,503,596 A | 4/1996 | Nagayama |
| 5,618,144 A | 4/1997 | Leistner |
| 5,672,038 A * | 9/1997 | Eaton ............................ 411/510 |
| 5,722,131 A | 3/1998 | Leistner |
| 5,762,190 A | 6/1998 | Leistner |
| 5,823,729 A | 10/1998 | Nagayama |
| 5,829,937 A * | 11/1998 | Morello et al. ............... 411/510 |
| 5,863,164 A | 1/1999 | Leistner |
| 5,904,461 A | 5/1999 | McKarge |
| 5,907,891 A * | 6/1999 | Meyer ............................ 24/453 |
| 5,918,738 A | 7/1999 | Leistner |
| 5,934,729 A * | 8/1999 | Baack .......................... 296/39.1 |
| 5,993,320 A | 11/1999 | Selle |
| 6,095,738 A | 8/2000 | Selle |
| 6,109,849 A | 8/2000 | Nagayama |
| 6,129,493 A | 10/2000 | Leistner |
| 6,139,237 A | 10/2000 | Nagayama |
| 6,183,181 B1 | 2/2001 | Leistner |
| 6,185,870 B1 | 2/2001 | Mettler |
| 6,209,722 B1 | 4/2001 | Leistner |
| 6,305,888 B1 | 10/2001 | Leistner |
| 6,637,994 B2 | 10/2003 | Leistner |
| 6,640,968 B2 | 11/2003 | Selle |
| 6,669,426 B1 * | 12/2003 | Detter et al. .................. 411/510 |
| 6,719,513 B1 * | 4/2004 | Moutousis et al. ........... 411/510 |
| 6,799,931 B2 * | 10/2004 | Kwilosz ........................ 411/510 |
| 6,804,864 B2 * | 10/2004 | Kirchen et al. ................. 24/297 |
| 7,257,870 B2 * | 8/2007 | Deas et al. ...................... 24/453 |
| 7,503,528 B2 * | 3/2009 | Adams et al. ................... 248/71 |
| 7,524,129 B2 * | 4/2009 | Selle ............................... 403/13 |
| 7,614,836 B2 * | 11/2009 | Mohiuddin et al. .......... 411/510 |
| 7,762,506 B2 * | 7/2010 | Beshore ...................... 248/188.9 |
| 7,862,272 B2 * | 1/2011 | Nakajima ....................... 411/45 |
| 7,891,926 B2 * | 2/2011 | Jackson, Jr. ................... 411/510 |
| 7,896,601 B2 * | 3/2011 | Kalyanadurga et al. ...... 411/510 |
| 2003/0044259 A1 * | 3/2003 | Kwilosz ........................ 411/510 |
| 2003/0231943 A1 * | 12/2003 | Detter et al. .................. 411/510 |
| 2005/0232724 A1 | 10/2005 | Selle |
| 2007/0261332 A1 * | 11/2007 | Mohiuddin et al. ......... 52/236.9 |
| 2007/0280804 A1 | 12/2007 | Selle |
| 2010/0104398 A1 * | 4/2010 | Lemire et al. ................. 411/510 |
| 2011/0117355 A1 * | 5/2011 | Selle .............................. 428/223 |

OTHER PUBLICATIONS

U.S. Appl. No. 12/329,601, filed Dec. 7, 2008, Selle.

* cited by examiner

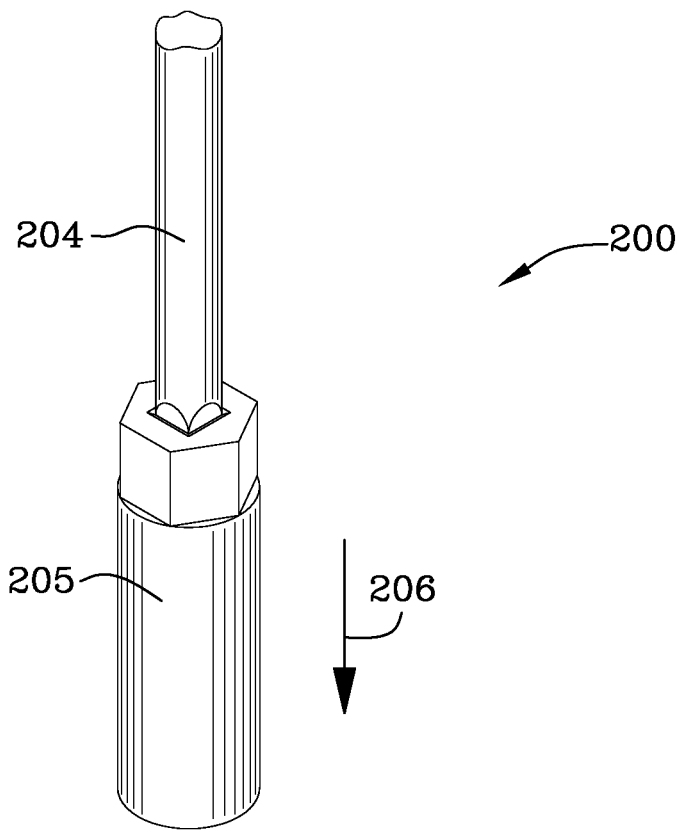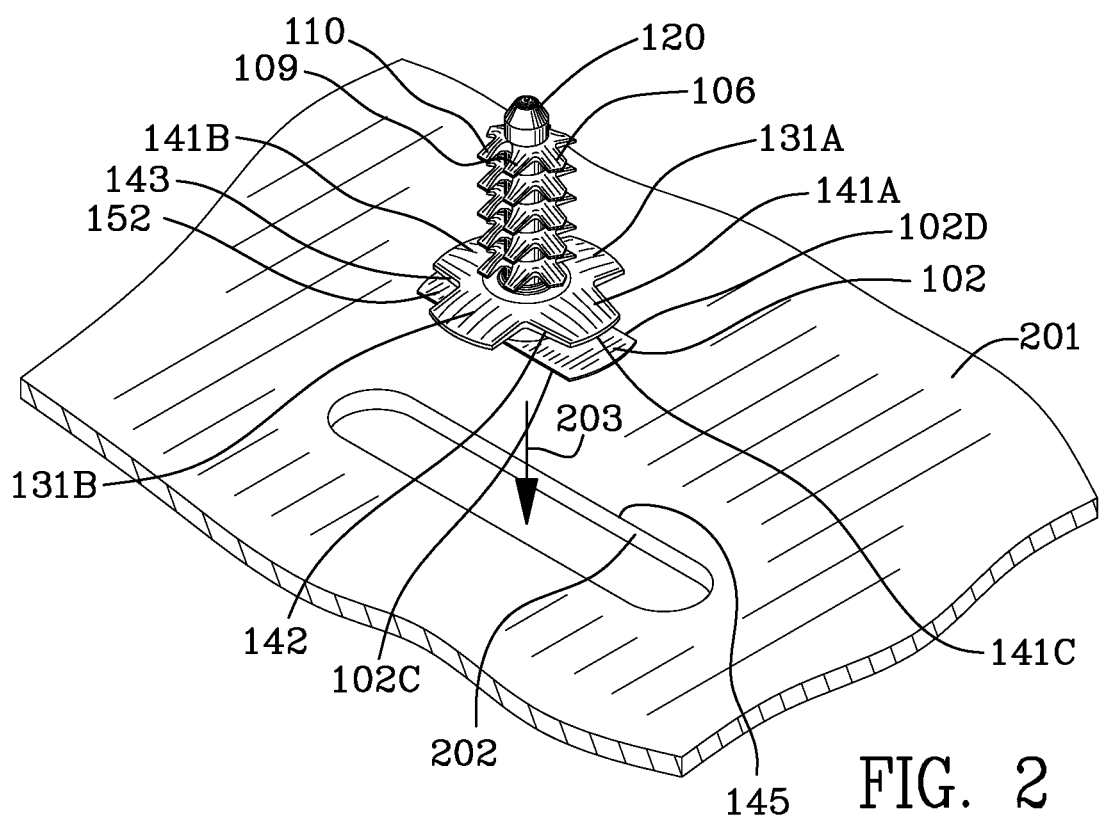
FIG. 2

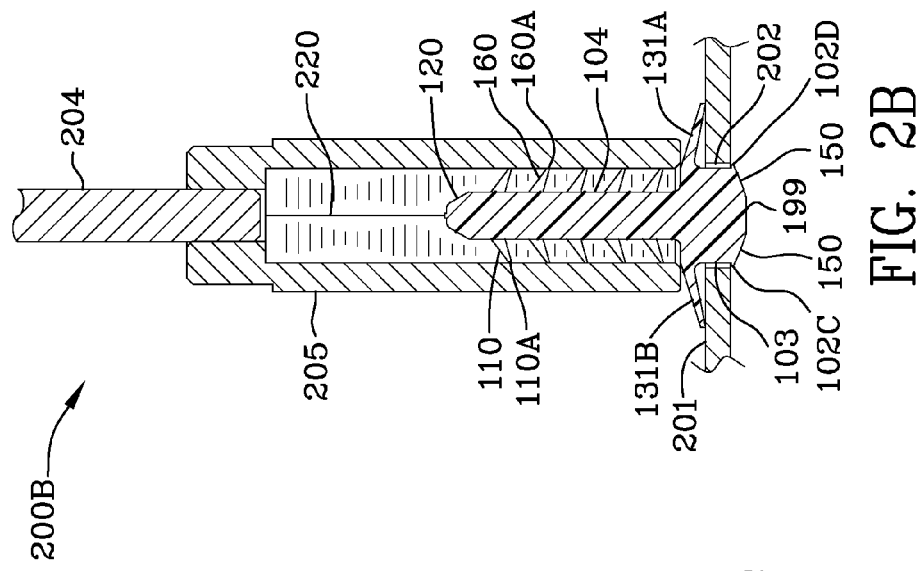
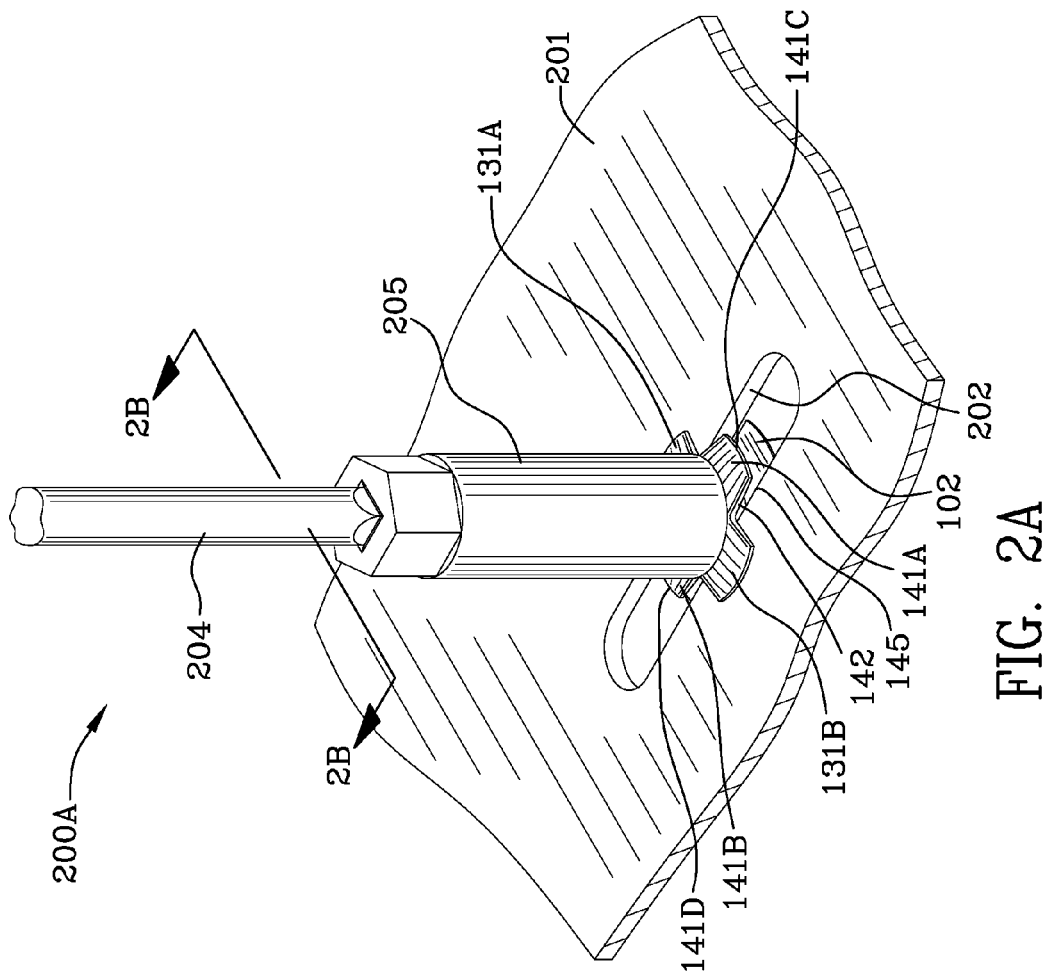

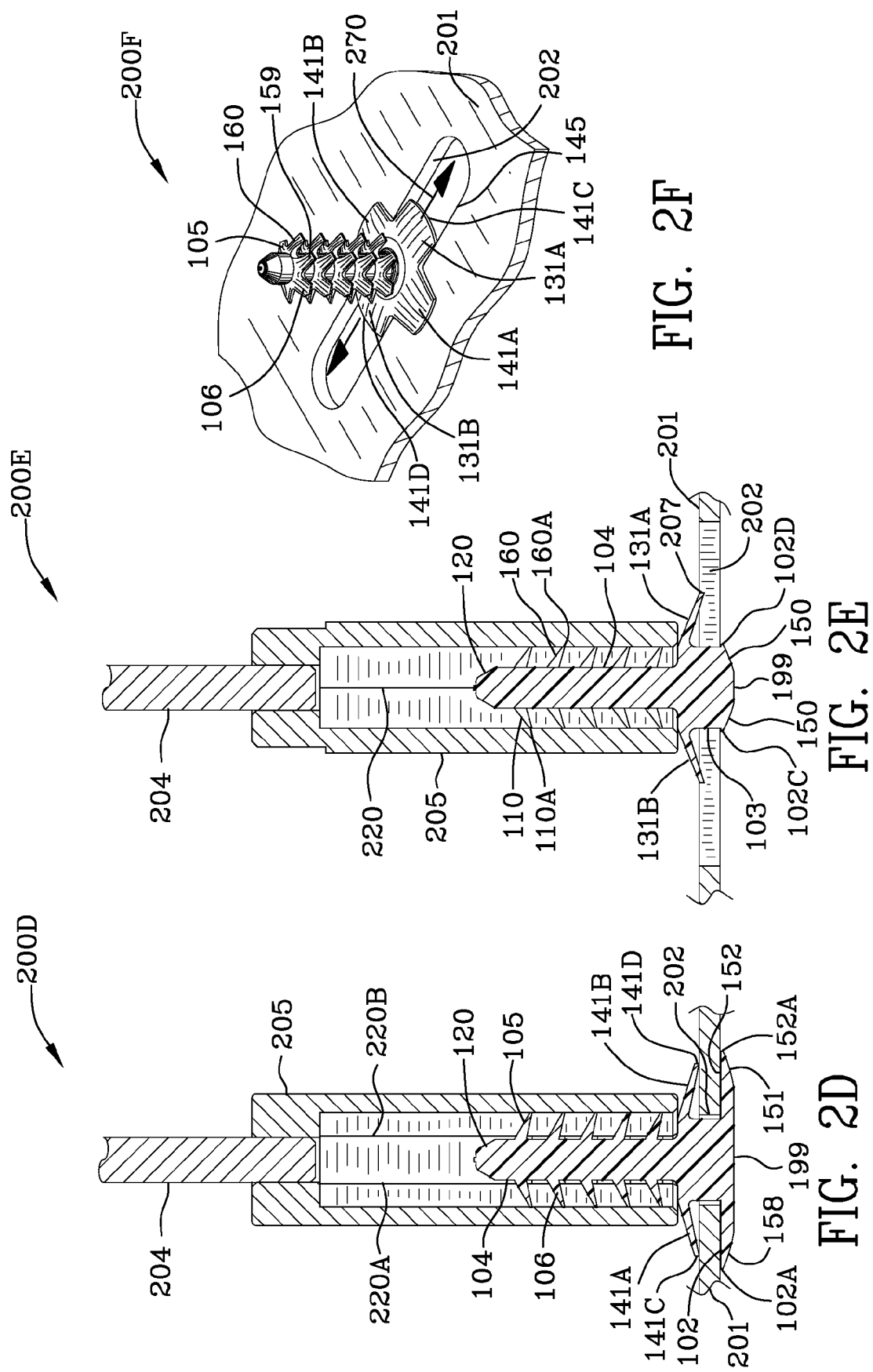

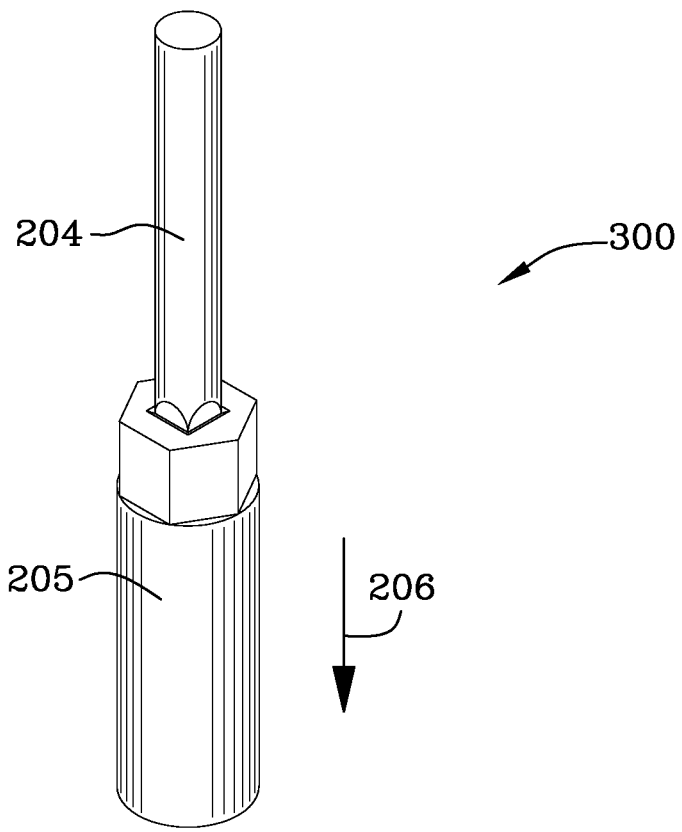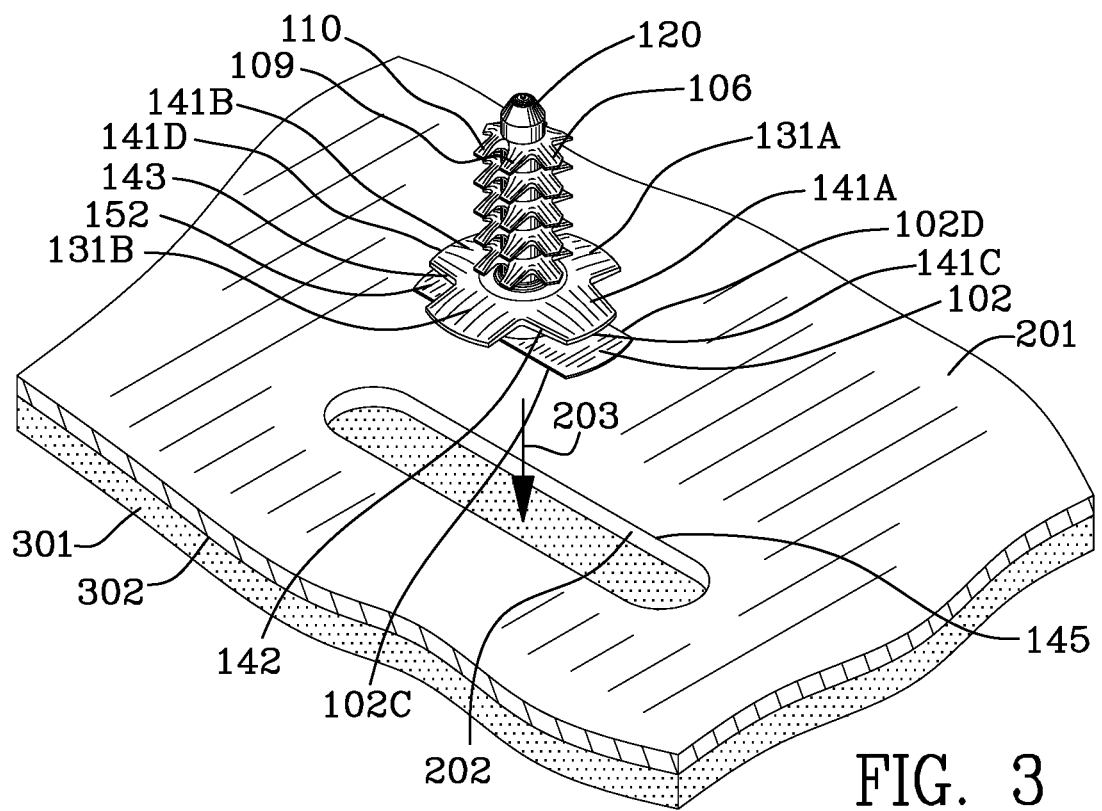
FIG. 3

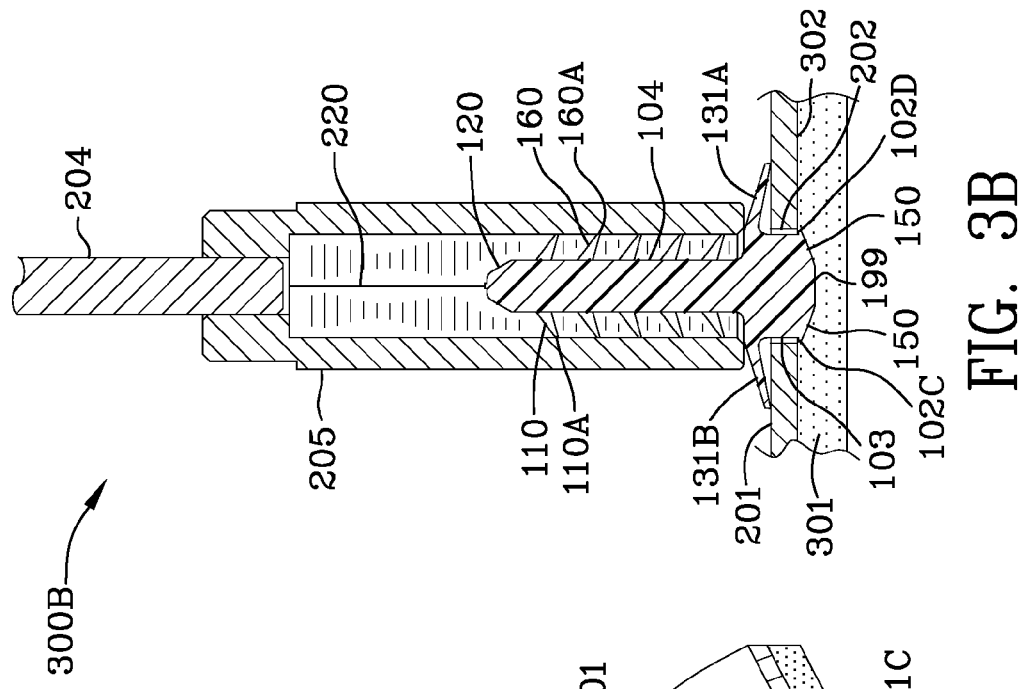
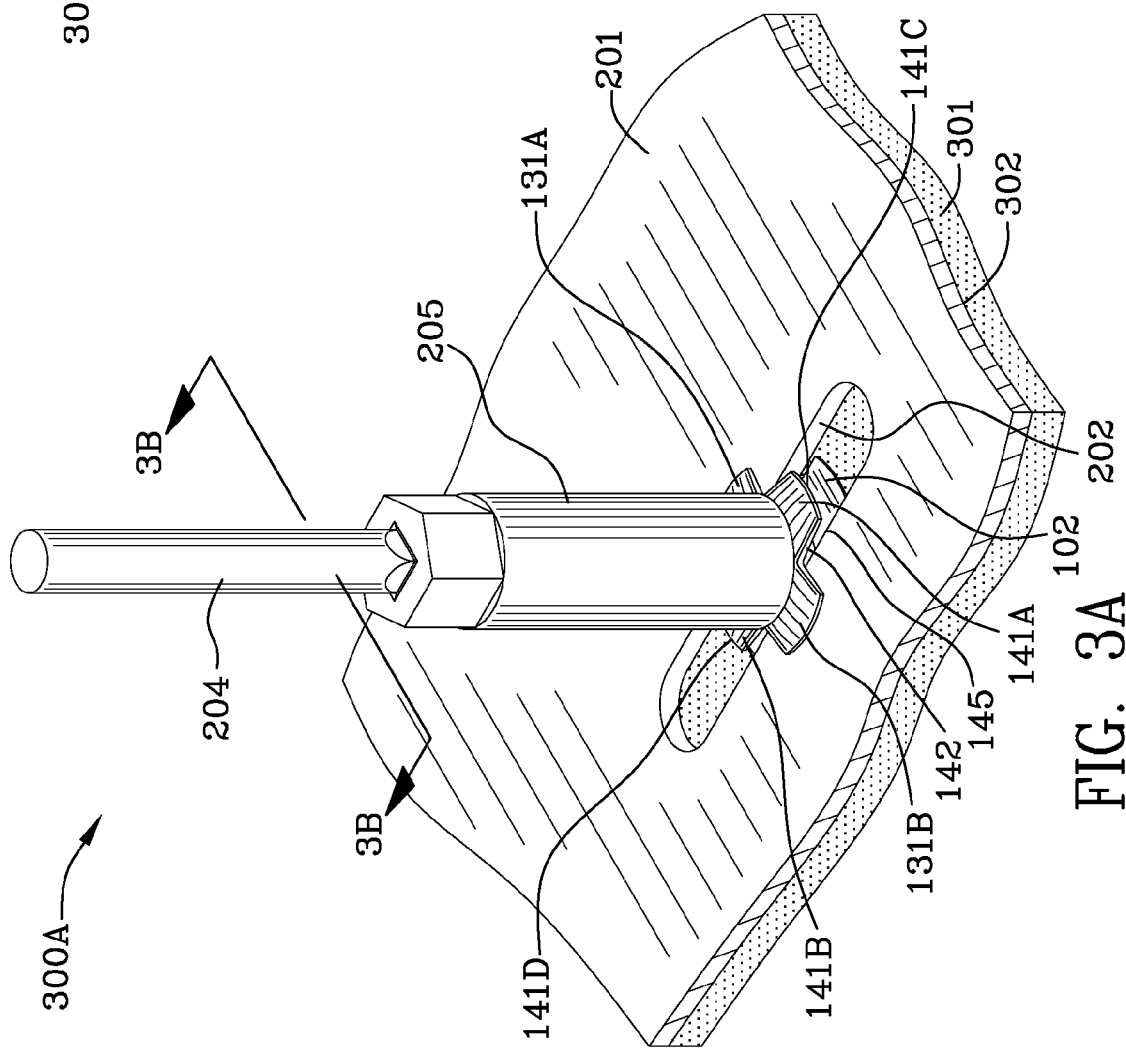
FIG. 3B
FIG. 3A

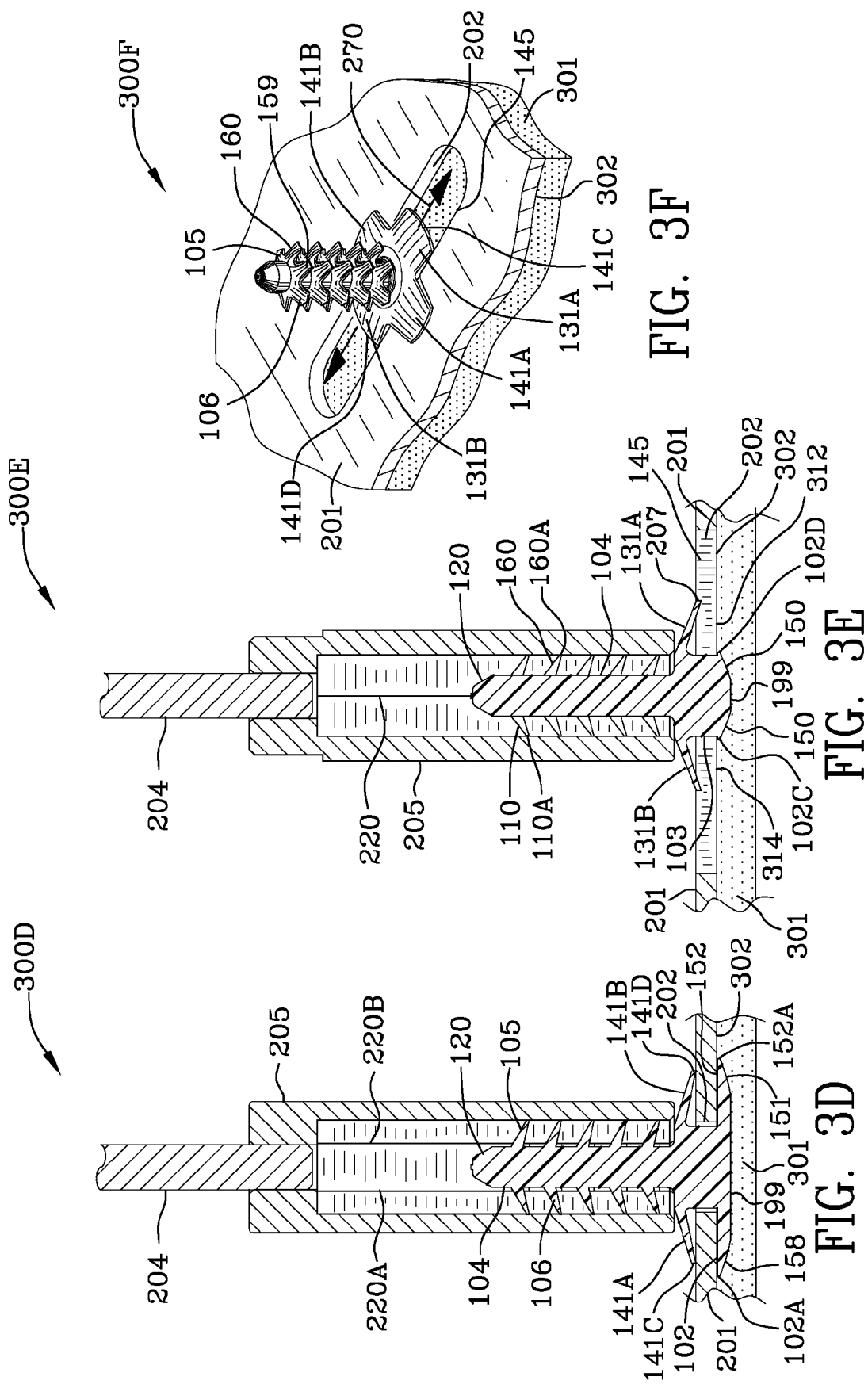

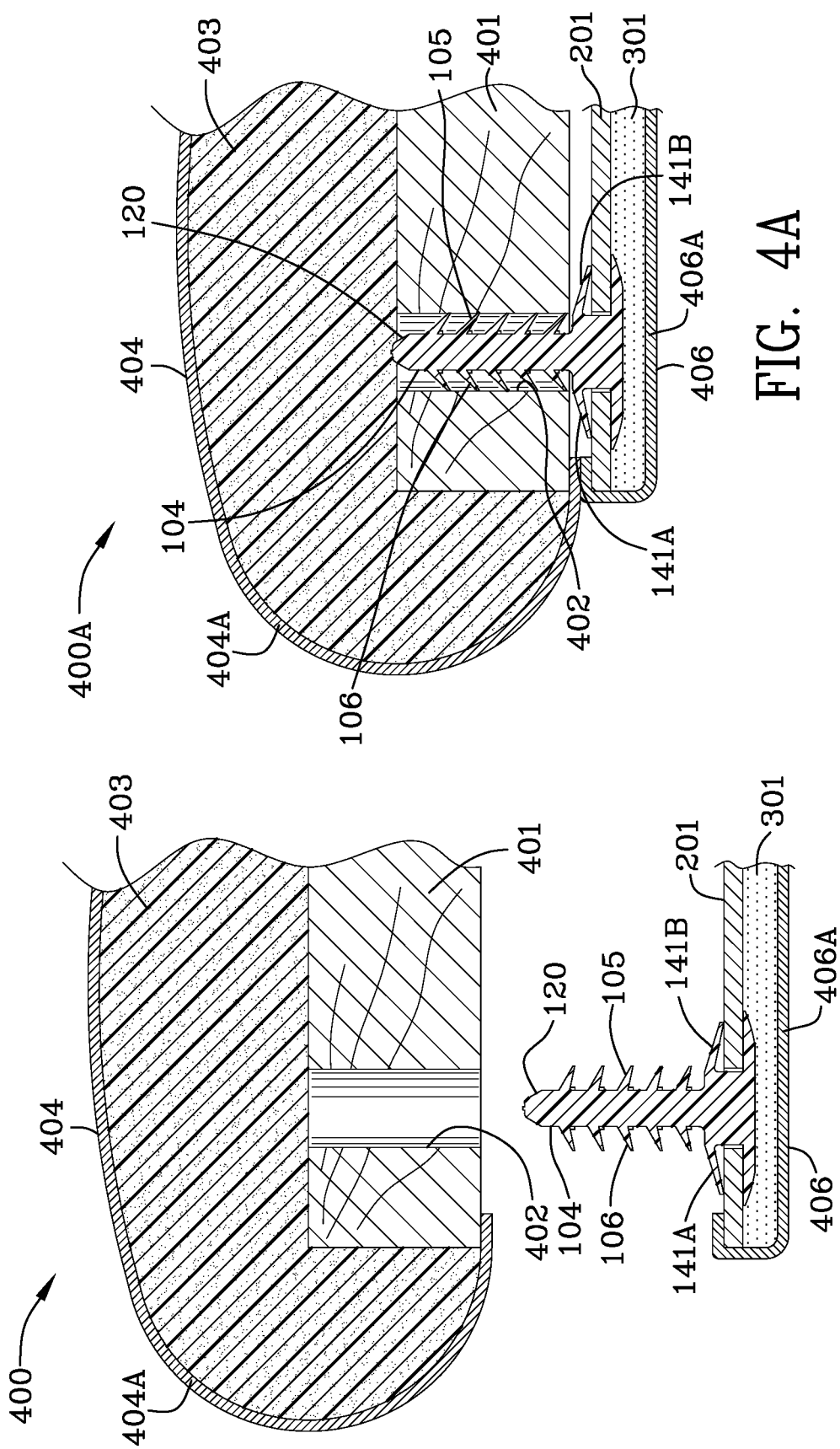

FASTENER

FIELD OF THE INVENTION

The invention is in the field of fasteners.

BACKGROUND OF THE INVENTION

United States Patent Application Publication No. 20080193254 (inventors Stephen Selle and Jonathan Wayne Dieter), entitled "Fastener" discloses "a fastener in combination with a substrate wherein the fastener is affixed to the substrate in a manner that does not damage the substrate. The fastener comprises a barrel having an interior, an exterior, a first end portion, a second end portion, and an intermediate portion. The first end portion of the barrel includes a flange. The exterior of the barrel proximate the flange includes a gripping portion with a spline having at least 12 teeth. The interior of the barrel proximate the second end portion of the barrel includes a counterbore. The interior of the barrel proximate the intermediate portion is threaded. The second end portion of the barrel is flared. The substrate includes a cylindrically shaped bore extending therethrough. The barrel of the fastener partially resides in the bore of the substrate and the 12 toothed spline on the exterior of the barrel of the fastener engages the bore of the substrate and surrounding material with minimal deformation."

United States Patent Application Publication No. (inventor Stephen Selle) 20080191111, entitled, "Leveling Device and Method for Making Same," discloses "an improved leveling device for adjusting the height of a substrate with a leveling device located between the floor and the bottom of the piece of furniture. The leveling device is comprised by a threaded stud which resides in a propel nut. The threaded stud is comprised by a first end, an end cap, and a second end, a leveling surface. The leveling device is inserted into a bore in the bottom of the piece of furniture. The propel nut of the leveling device grips the bore and holds the leveling device in the bore. The oversized end cap with respect to the threaded stud and the propel nut in combination with the bore of the substrate is resistably movable and exerts a force against the bore in the substrate to counter forces exerted against the leveler by the floor when dragging the furniture."

United States Patent Application Publication No. 20080069660 (inventor Stephen Selle), entitled Hopper Fed Tee nut Having Counterbore With Nylon Lock, discloses "a tee nut fastener which includes a nylon locking ring located distally from the entrance to a passageway ensures proper fastening upon coupling with a threaded stud. The tee nut is used use in combination with a track for efficient delivery. The track comprises an upper guide spaced apart relatively farther than a lower guide. The process for making the tee nut uses a cold heading process. The tee nut includes a flange having an upper portion and a lower portion. A shank extends perpendicularly from the upper portion and a head extends oppositely from the shank and perpendicularly from the lower portion. The flange includes at least two teeth extending in the direction of the shank and a passageway through the shank, flange and head. The passageway includes a bore countersunk at both ends thereof, a cavity, and threads therein. A locking ring resides in the cavity and is relatively thin compared to the length of the teeth to ensure that the tee nut is not extricated from a substrate in which the prongs or teeth are embedded upon coupling with a threaded stud."

United States Patent Application 20070280804 (inventor Stephen Selle), entitled "Fastener and Process for Using Same," discloses "a connector for securing first and second substrates together, comprising: an outer fastener and an inner fastener is disclosed and claimed. The outer fastener comprises a dowel shaped stud. The inner fastener comprises a flange and a pair of clips. The pair of clips includes a first portion and a second portion. The flange is lanced and includes a punched out portion. The stud interengages the flange and the second portion of the pair of clips urges the clips away from each other and away from the stud. The outer fastener is pressed into the first substrate and the second portion of the clips is pressed into the second substrate. The second portion of the clips include a turned back portion and the turned back portion of the clip grip the second substrate preventing removal of the inner fastener from the second substrate. The connector is tolerant of the misalignment of the inner and outer fasteners and the bores in which the fasteners reside."

United States Patent Application Publication No. 20050232724 (inventor Stephen Selle) entitled "Adjustable Threshold Fastener with Flanges" discloses "a fastener comprising a threaded stud and a rectangular nut having raised flanges is disclosed. Raised flanges enable passing the fasteners in a curvilinear dispensing track. The rectangular nut resides in a channel in a threshold device and is restrained against rotational movement. The threaded stud includes a flat head adjustable in a plurality of positions which, in turn, enables positioning of the threshold."

U.S. Pat. No. 6,640,968 (inventor Stephen Selle) entitled "Retainer" discloses "a stud retainer comprising a generally disk shaped body having a periphery, an aperture therethrough and a wing portion extending from said periphery is disclosed and claimed. The disk shaped body includes a crown and the crown is concentric with the aperture. The wing portion extends laterally and transversely from an arcuate portion of the periphery of the disk shaped body. The aperture has an inner diametrical surface and an outer diametrical surface. The inner and outer diametrical surfaces of the aperture are smooth. A delivery track for guiding the stud retainers is disclosed and claimed. The process for making the stud retainer is also disclosed and claimed. The process includes the steps of: punching a hole in the spring steel from a first side of the sheet of spring steel creating a smooth surface on the inlet side of said hole, coining the hole from the other side of the steel creating a smooth service on the outlet side of the hole, embossing the hole from the other side of the steel; and, cutting off the stud retainer from said sheet of spring steel."

U.S. Pat. Nos. 5,993,320 and 6,095,738 (inventor Stephen Selle) entitled "Tee Nut and Method of Manufacture" discloses "a tee nut and method of manufacture is provided which T nut includes a flange and a hollow barrel extending from the flange. The flange is general circular and has a pair of pawls extending upwardly therefrom, each of which terminates in teeth for engaging a base member. The barrel has an end portion proximal to the flange and a distal end portion. The proximal end portion has internal female threads and the distal end portion has a smooth unthreaded inner surface. The wall thickness of the distal end portion is thinner than the wall thickness of the proximal end portion, and the outer wall diameter is essentially constant for the length of the barrel. The barrel is formed first as an elongate member extending from a strip of material initially having a constant inner diameter and an outer diameter of the proximal portion greater than the outer diameter of the distal portion, with the distal portion having a wall thickness thinner than the wall thickness of the proximal portion. The outer diameter of the distal portion is increased to the same diameter as the outer diameter of the proximal portion while maintaining the same wall thicknesses of both the distal and proximal portions. The internal surface of the proximal portion is threaded with threads terminating at the distal portion and having a lead angle of at least about 80°. The terminal end surface of the distal portion is essentially planar and parallel to a flange."

SUMMARY OF THE INVENTION

The Christmas tree fastener includes an upper plate having first and second longitudinal tabs and first and second transverse tabs. The fastener illustrated and described herein is molded and all components are, therefore, integral. A longitudinal head resides underneath the upper plate and a shank interconnects the upper plate and the longitudinal head. A shaft extends from the upper plate and first and second branches extend from the shaft. The first and second branches include ends with beveled (angled) edge surfaces terminating in an apex. Third and fourth branches also extend from the shaft and are arranged adjacent each other. Fifth and sixth branches extend from the shaft and are arranged adjacent each other. The third, fourth, fifth and sixth branches include ends which terminate in a square edge. The beveled edges of the first and second branches, the apex of the first and second branches and the squared edges of the third, fourth, fifth and sixth branches form a hexagonal profile for interengagement with a hexagonal socket.

Branches 105, 106, 109, 110, 159, 160 extend circumferentially around the shaft 104 as illustrated in FIGS. 1C-1E and are located an equal axial distance along the shaft 104 from the upper plate having longitudinal tabs 141A, 141B and transverse tabs 131A, 131B. The branches are arranged in a plurality of rows arranged about the shaft 104 as illustrated in FIGS. 1D and 1E.

Preferably the first and second longitudinal tabs are tapered and are made of nylon. The fastener is used in connection with a substrate having a slot (keyhole) therein. The substrate includes a front side and a back side. Foam is affixed to the back side of the substrate. The longitudinal head includes cutting edges. The fastener and the longitudinal head are rotatable. The cutting edges of the longitudinal head cut the foam backing of the substrate as the fastener and the longitudinal head are rotated. The slot in the substrate includes a wall portion therein. The first and second longitudinal tabs include side wall portions and end portions. The first and second longitudinal tabs are tapered and are wider near the shaft and are narrower near the end portions of the tabs. The side wall portions proximate the wider portion of the longitudinal tabs slidingly engage the walls of the slot (key hole) first and ride up on the front side of the substrate as the rotation of the fastener continues. The fastener is made of nylon and is resilient to enable the side wall portions of the longitudinal tabs to ride up on the front side of the substrate. As rotation of the fastener continues, the side wall portions of the longitudinal tabs toward the end portions thereof ride up and over the front side of the substrate. When the rotation continues such that the longitudinal tabs have been rotated through an angle of about 90°, the first and second transverse tabs are forced into the slot (key hole) because of the tension they are under due to their shape. The first and second transverse tabs are formed such that they are in effect angled downwardly with respect to the shaft. As rotation of the fastener and the longitudinal tabs continue, the first and second transverse tabs are aligned and are spring loaded in the slot (key hole) preventing movement of the fastener in a direction transverse to the slot (key hole).

A method for using a fastener with a substrate is disclosed where, the fastener includes: an upper plate having first and second longitudinal tabs and first and second transverse tabs; a longitudinal head, a shank interconnecting the upper plate and the longitudinal head; a shaft extending from the upper plate, branches extending from the shaft, the longitudinal head includes cutting edges, the first and second longitudinal tabs include side wall portions and end portions, the first and second longitudinal tabs are tapered, the first and second longitudinal tabs are wider near the shaft and are narrower near the end portions of the tab, the substrate includes a foam backing and a slot (keyhole) therein, the slot in the substrate includes a wall portion therein, the substrate includes a front side and a back side, the foam affixed to the substrate, comprising the steps of: placing the longitudinal head of the fastener into the slot (keyhole) of the substrate; rotating the fastener and the longitudinal head; cutting, using the cutting edges of the longitudinal head, the foam backing of the substrate as the fastener and the longitudinal head are rotated; engaging, slidingly, the side wall portions proximate the wider portion of the longitudinal tabs with the walls of the slot (key hole) first and then riding the side wall portions of the longitudinal tabs up onto the front side of the substrate and as rotation of the fastener and the longitudinal tabs continue; aligning and engaging the first and second transverse tabs in the slot (key hole) preventing movement of the fastener in a direction transverse to the slot.

The method additionally includes the steps of: inserting the branches extending from the shaft into a receptacle. The method further includes use of first and second branches extending from the shaft. The first and second branches include ends. The ends of the first and second branches include beveled edge surfaces terminating in an apex. Third and fourth branches extending from the shaft are arranged adjacent each other. Fifth and sixth branches extend from the shaft arranged adjacent each other. The third, fourth, fifth and sixth branches include ends. The ends of the third, fourth, fifth and sixth branches terminate in a square edge. The method may further comprises the steps of interengaging, with a hexagonal socket, the beveled edges of the first and second branches, the apex of the first and second branches and the squared edges of the third, fourth, fifth and sixth branches forming a hexagonal profile.

The fastener is simple to install. Two locking tabs of the longitudinal slot (key hole) lock in place axially when they are rotated 90°. The fastener may be installed by hand or it may be installed with a hex socket. Usually a hexagonal socket will be used if large numbers of fasteners are to be inserted. Various size hex sockets and hex fasteners can be used and the particular example illustrated herein is for a ⅜ hexagonal socket. The fastener is held perpendicular to backer board (substrate). The fastener may slide in the slot in one direction if there is misalignment in with respect to the receptacle. If the fastener breaks in installation, it can be removed and replaced without taking the upholstery off the piece of trim piece (mounted, for example to a first substrate).

It is an object of the present invention to provide a fastener which may be used with a foam backed substrate where the foam is secured to the back side of the substrate with adhesive.

It is a further object of the invention to provide a fastener which may be secured to a substrate such that the fastener is adjustable in a longitudinal direction.

It is a further object of the invention to provide a fastener which may be driven by a socket.

It is a further object of the invention to provide a fastener which may be driven by a hexagonal socket.

It is a further object of the invention to provide a fastener which may cut through a foam secured by adhesive to the back side of a substrate.

It is a further object of the invention to provide a fastener wherein a tab secures the fastener in a keyhole slot.

These and other objects will become apparent when reference is made to the Brief Description of the Drawings and Description of the Invention.

BRIEF DESCRIPTION OF THE DRAWINGS

FIG. 2 is a perspective view of the hexagonal socket, Christmas tree fastener, and the slot in the substrate.

FIG. 2A is a perspective view of the socket engaged with the Christmas tree fastener with the fastener inserted into the slot in the substrate.

FIG. 2B is a cross-sectional view taken along the lines 2B-2B of FIG. 2A.

FIG. 2D is a cross-sectional view taken along the lines 2D-2D of FIG. 2C.

FIG. 2E is a cross-sectional view taken along the lines 2E-2E of FIG. 2C.

FIG. 2F is a perspective view of the fastener in the slot with the transverse tabs interengaging the walls of the slot.

FIG. 3 is an exploded view of the hexagonal socket, Christmas tree fastener, and the slot in the substrate.

FIG. 3A is a perspective view of the socket engaged with the Christmas tree fastener with the fastener inserted into the slot in the substrate.

FIG. 3B is a cross-sectional view taken along the lines 3B-3B of FIG. 3A.

FIG. 3D is a cross-sectional view taken along the lines 3D-3D of FIG. 3C.

FIG. 3E is a cross-sectional view taken along the lines 3E-3E of FIG. 3C.

FIG. 3F is a perspective view of the fastener in the slot with the transverse tabs interengaging the walls of the slot.

FIG. 4 is a cross-sectional view of the fastener positioned in a substrate for joinder with another substrate.

FIG. 4A is a cross-sectional view of the fastener and substrates of FIG. 4 joined together with the shaft of the fastener and branches inserted into the second substrate.

DESCRIPTION OF THE INVENTION

Figure 1:
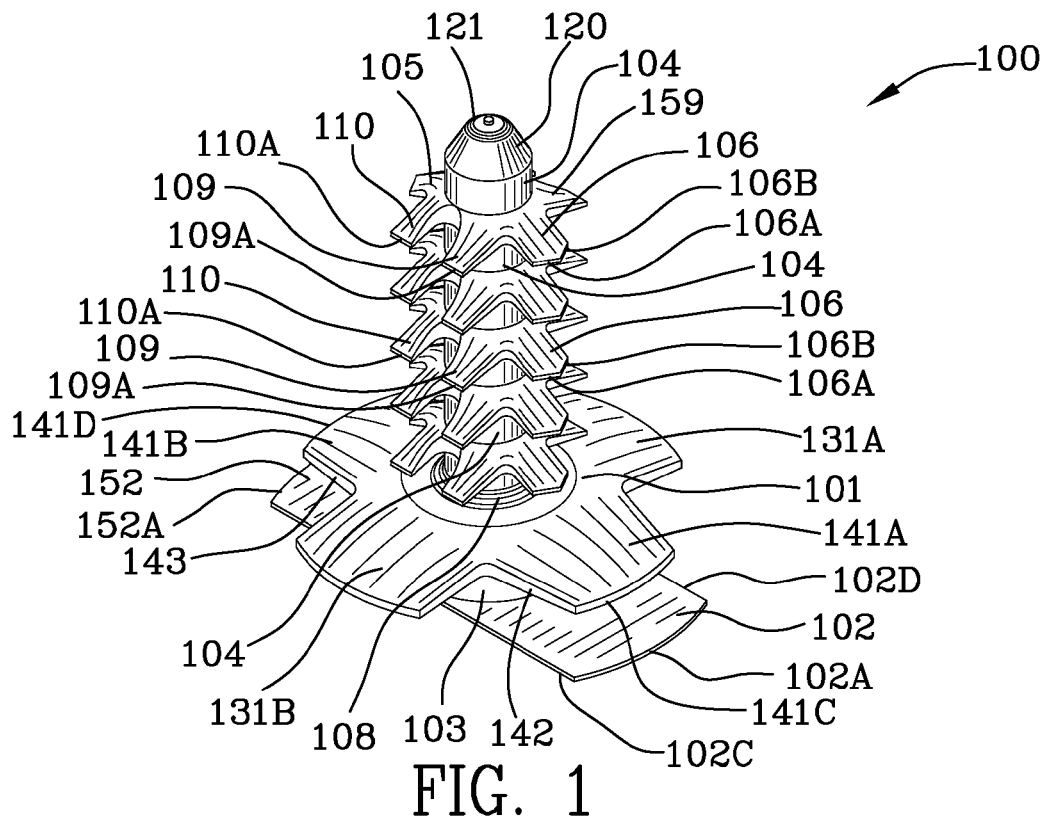
FIG. 1 is a perspective view of the Christmas tree fastener.
Figure 1A:
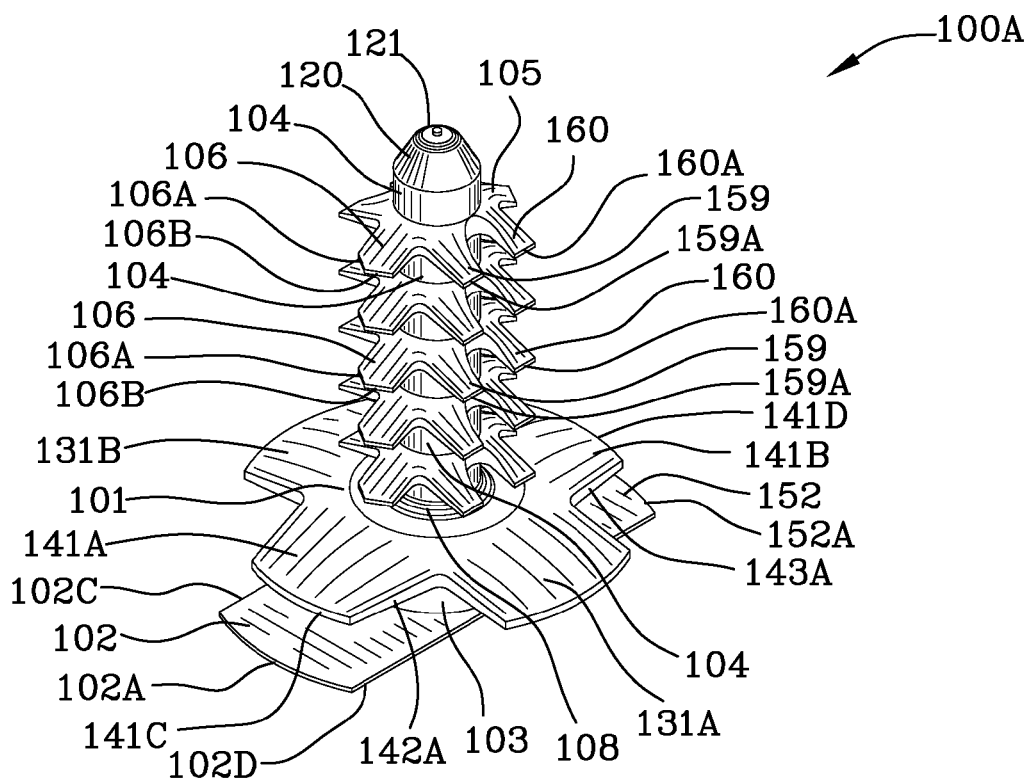
FIG. 1A is another perspective view of the Christmas tree fastener.

The fastener illustrated herein is integrally molded and all components are, therefore, integral. FIG. 1 is a perspective view 100 of the Christmas tree fastener. Although the term "Christmas tree fastener" is used herein as one description of the invention, however, those skilled in the art readily recognize that the general term fastener may be used. FIG. 1A is another perspective view 100A of the Christmas tree fastener. Upper plate 101 includes first and second tapered longitudinal tabs 141A, 141B and transverse tabs 131A, 131B. The first and second longitudinal tabs are wider near the shaft 104 and are narrower near the end portions of the tabs. The longitudinal head/plate includes a first portion 102 and a second portion 152. First portion 102 includes an end 102A and second portion 152 includes an end 152A. The longitudinal plate further includes cutting edges 102C, 102D on the sides thereof to cut through foam and the like which may be applied to the back side of the substrate.

A shank 103 interconnects the longitudinal head/plate 102, 152 and the upper plate 101 and tabs 141A, 141B, 131A. 131B. Shank 103 is positioned intermediate portions 102, 152 of the longitudinal head/plate. The longitudinal plate is separated apart from the upper plate by shank 103. A shaft 104 extends upwardly from the upper plate 101. Branches 105, 106 extend from shaft 104 and include angled (beveled) tip portions 105A, 105B, 106A, 106B at a slight angle with respect to shaft 104. Angled tip portions 105A and 105B form and terminate in apex 105C. Angled tip portions 106A and 106B form and terminate in apex 106C. Branches 105, 106 are oriented 180° from each other and extend generally radially and downwardly from shaft 104 at a slight angle with respect to shaft 104. Reference numeral 108 indicates the radius joining upper plate 101 and shaft 104. Branch pairs 109, 110 and 159, 160 extend from the shaft 104 and are oriented at a slight angle downwardly from the shaft. Branch pairs 109, 110 include flat end portions 109A, 110A and corners 109C, 110C. Branch pairs 159, 160 include flat end portions 159A, 160A and corners 159C, 160C. Corners 109C, 110C, 159C and 160C form apexes which together with apexes 105C and 106C form the hexagonal pattern 190. See FIG. 1C.

Since all of the branches are angled slightly downwardly, and since the bore 402 of the substrate in which the branches are forced into is smaller than the diameter of the fastener, the fastener cannot be extracted from the bore 402. See FIGS. 4 and 4A. When reference is made to the fastener, the shaft and the branches extending therefrom, it will be noted from FIG. 1C (and other drawing Figs.) that the fastener does not have a "diameter" per se. Rather, the distance between points 106C and 105C; 109C and 160C; 110C and 159C if circumscribed would form a circle. In geometry, the circumscribed circle or circumcircle of a polygon is a circle which passes through all the vertices of the polygon. The center of this circle is called the circumcenter. A polygon which has a circumscribed circle is called a cyclic polygon. All regular simple polygons, all triangles and all rectangles are cyclic.

Figure 1B:
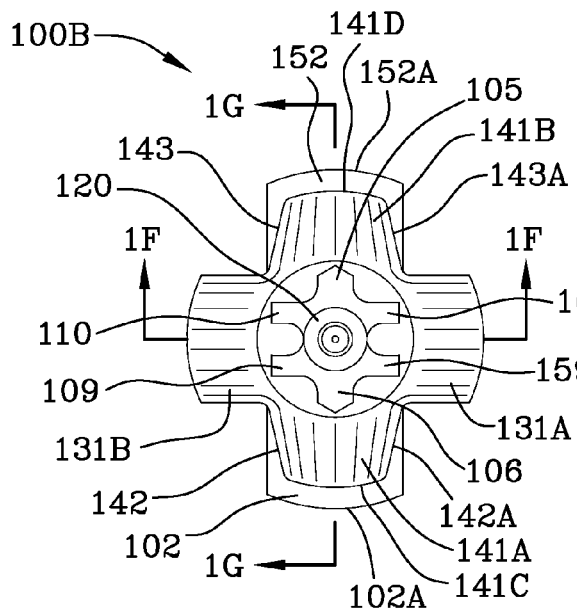
FIG. 1B is a top view of the Christmas tree fastener.
Figure 1C:
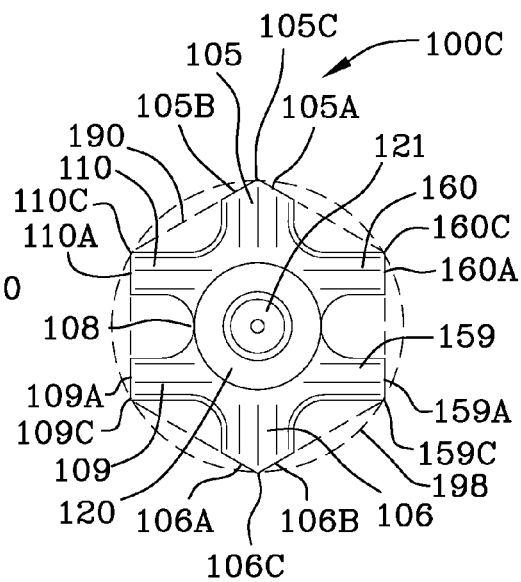
FIG. 1C is a hexagonal arrangement of the branches of the Christmas tree fastener.

The circumscribed circle 198 drawn in phantom is representative of the hexagonal pattern 190 is illustrated in FIG. 1C. The diameter of the circumscribed circle 198 is larger than the diameter of the bore or receptacle 402.

Shaft 104 includes a tapered portion 120 terminating in an end portion or top 121. Edges 142, 142A of transverse tab 141A and edges 143, 143A of tab 141B ride up on lip 145 of slot 202 in the substrate 201. As rotation of the fastener in the clockwise direction begins there will be two contact areas on tabs 141A and 141B, namely, surfaces 142 and 143A will engage lip 145 and ride up and over the lip and onto the front side of the substrate 201. See FIGS. 2A and 3A illustrating the lip 145 and the surface 142 of the longitudinal tab 141A. FIG.

3A is a perspective view of the socket 205 engaged with the Christmas tree fastener with the fastener inserted into the slot 202 in the substrate 201.

FIG. 1B is a top view 100B of the Christmas tree fastener and illustrates the upper plate 101, tabs, branches extending from the shaft 104, and longitudinal plate. FIG. 1C illustrates diagrammatically a hexagonal arrangement 100C of the branches of the Christmas tree fastener. Reference numeral 190 is a schematic representation of the hexagonal socket pattern formed by the branches of the fastener. Reference numeral 190 indicates in phantom the hexagonal pattern of the end portions 109A, 110A, 160A, 159A of the branches 109, 110, 159, 160 as well as the angled tip portions 106A, 106B, 105A, 105B of the branches 106, 105. A hexagonal wrench as illustrated in FIGS. 2-2F may be used to rotate the fastener approximately 90°. Alternatively, the fastener may simply be rotated by hand if space permits.

Figure 1D:
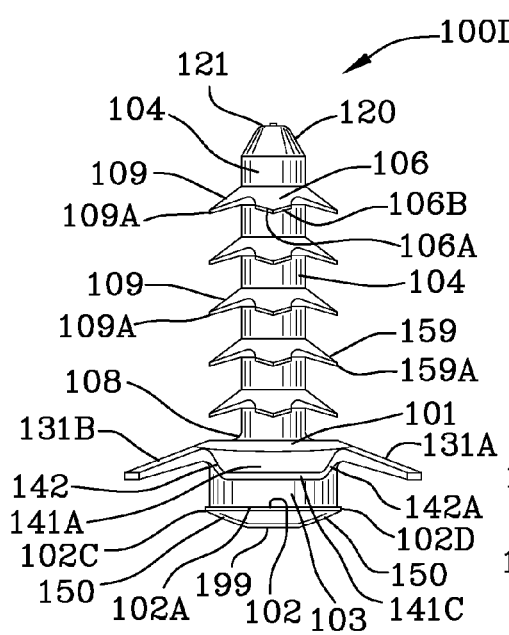
FIG. 1D is a front view of the Christmas tree fastener.

FIG. 1D is a front view 100D of the Christmas tree fastener illustrating the distance between tab 141A extending from the upper plate 101 and the portion 102 of the longitudinal plate. FIG. 1D further illustrates branches 106 extending generally radially from shaft 104. The space (unnumbered) between longitudinal plates 102, 152 and longitudinal tab 141A is viewed well in FIG. 1D. Cutting edges 102C, 102D of the longitudinal plates, transverse slopes 150 of the longitudinal plates and flat bottom 199 of the plates are shown in FIG. 1D. Reference numeral 199 is used to indicate the flat bottom portion of longitudinal plate 102, 152.

Figure 1E:
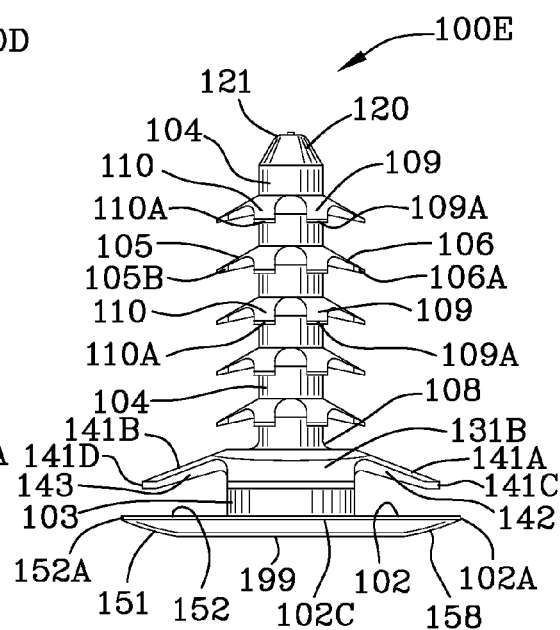
FIG. 1E is a side view of the Christmas tree fastener.

FIG. 1E is a side view 100E of the Christmas tree fastener illustrating the relationship between the upper plate 101 and tabs extending therefrom and the lower plate (102, 152). Shank 103 is seen interconnecting the upper plates and tabs with the lower longitudinal plate. FIG. 1E also illustrates the branches 109, 110 extending from shaft 104 in a general radial fashion. Branches 109 and 110 are spaced apart from each other as are branches 159, 160 on the other side of the shaft. FIGS. 1B and 1C show the relationship between the branches. Branches 109, 110 and 159, 160 are spaced apart as illustrated in FIGS. 1B and 1C.

Referring to FIGS. 1D and 1E, the longitudinal plate 150, 152 includes transversely sloped bottom portions 150. Longitudinally sloped bottom portions 151, 158 of the longitudinal head/plate 102, 152 are illustrated in FIG. 1E.

Figure 1G:
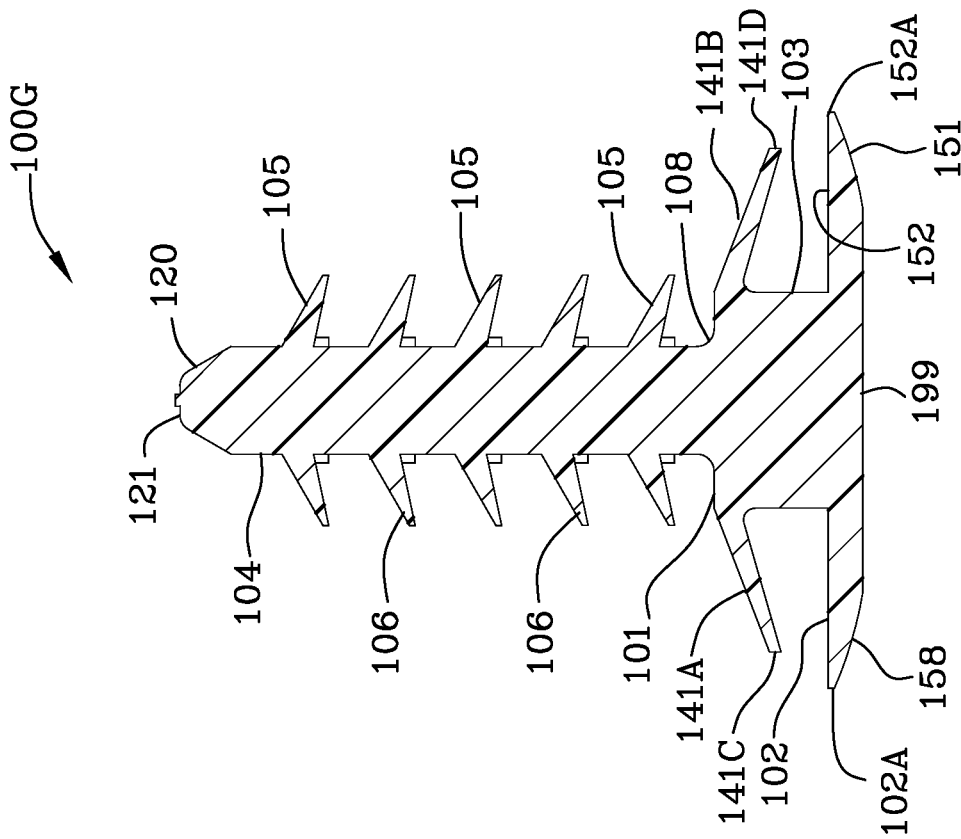
FIG. 1G is a cross-sectional view of the Christmas tree fastener taken along the lines 1G-1G of FIG. 1B.
Figure 1F:
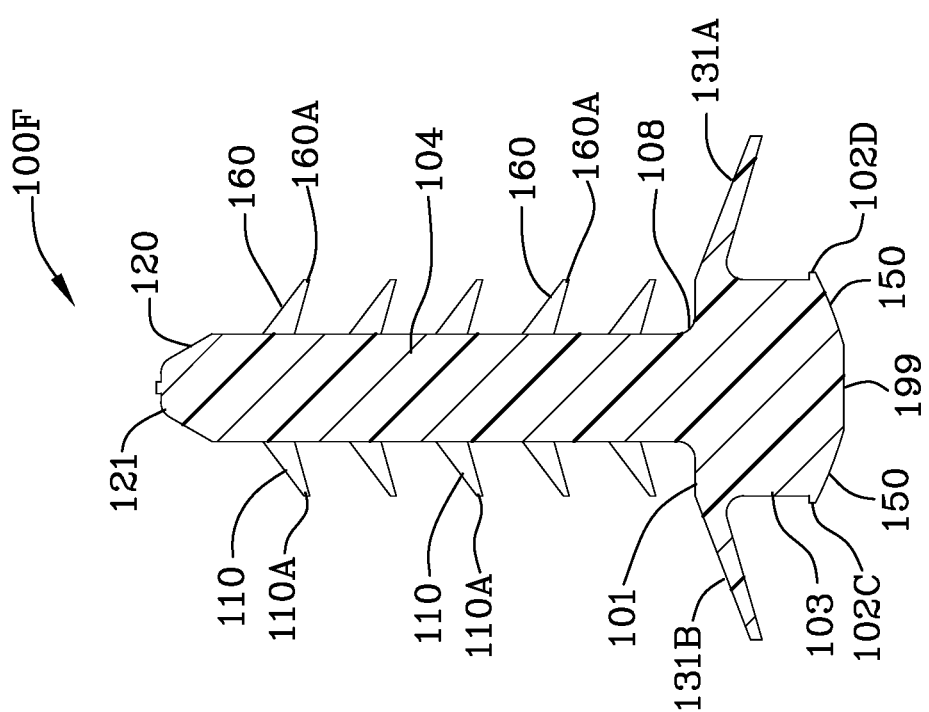
FIG. 1F is a cross-sectional view of the Christmas tree fastener taken along the lines 1F-1F of FIG. 1B.

FIG. 1F is a cross-sectional view 100F of the Christmas tree fastener taken along the lines 1F-1F of FIG. 1B and illustrates cutting edges 102C, 102D of the longitudinal plate. Cutting edges 102C and 102D facilitate ripping through foam backing glued or otherwise affixed on the backside of substrate 201. FIG. 1G is a cross-sectional view 100G of the Christmas tree fastener taken along the lines 1G-1G of FIG. 1B. FIG. 1G is a cross-sectional view 100G of the Christmas tree fastener taken along the lines 1G-1G of FIG. 1B and illustrates the spacing between the longitudinal tabs 141A, 141B and the longitudinal plate 102, 152. Longitudinal tabs 141A, 141B and transverse tabs 131A, 131B are flexible such that the distance between the tabs and the plates 102, 152 changes as the tabs are flexed during rotation of the fastener.

FIG. 2 is a perspective view 200 of the hexagonal socket 205, Christmas tree fastener, and slot 202 in the substrate 201. FIG. 2A is a perspective view 200A of the socket 205 engaged with the Christmas tree fastener with the fastener inserted into the slot 202 in the substrate 201. FIGS. 2 and 2A illustrate substrate 201 and slot 202 therein.

Arrow 203 indicates the downward movement of the Christmas tree fastener and arrow 206 indicates the downward movement of the socket 205. Socket 205 is driven by shaft 204. In FIG. 2A, the fastener with the socket 205 thereover has been placed in the slot 202 which is formed by walls. FIG. 2A illustrates the socket 205 engaging the fastener and covering same. FIG. 2B is a cross-sectional view 200B taken along the lines 2B-2B of FIG. 2A. Inner joint 220 or apex of socket 205 is illustrated in FIG. 2B. Branches 110 and 160 and respective squared edges 110A, 160A of the branches interengage flat surfaces (unnumbered) within socket 205.

Referring to FIGS. 1C and 2B, apex 105C interengages inner joint 220 of the socket. In FIG. 2B, apex 105C is behind shaft 104 and cannot be viewed. The hexagonal pattern of the branches is diagrammatically illustrated by reference numeral 190 as illustrated in FIG. 1C. The hexagonal interior of the socket 205 interengages the hexagonal pattern 190 formed by the end portions 109A, 110A, 160A, 159A of branches 109, 110, 159, 160 and the angled tip portions 106A, 106B, 105A, 105B of branches 106, 105. See also FIG. 1C.

Figure 2C:
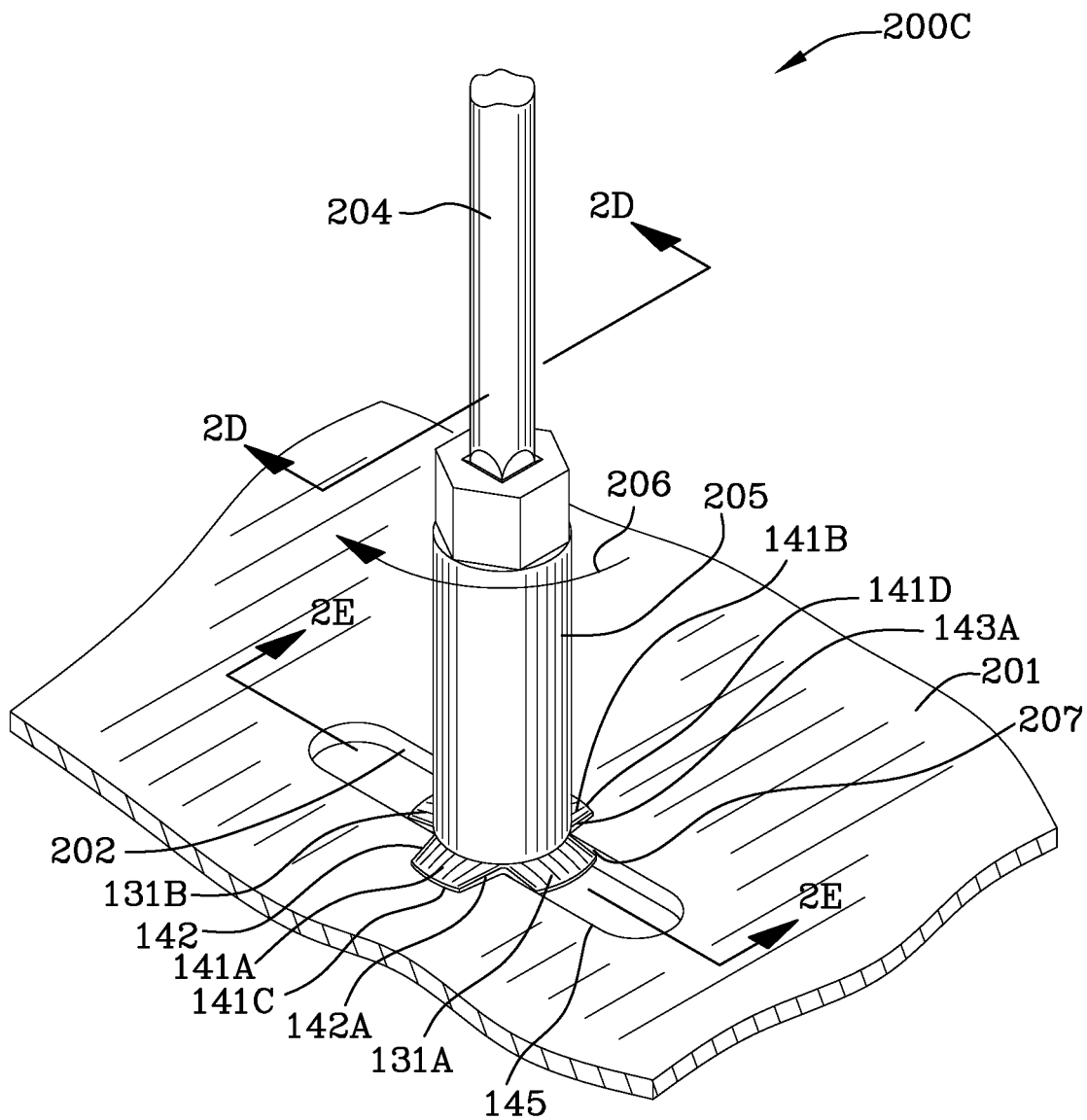
FIG. 2C is a perspective view of the rotated socket engaged with the Christmas tree fastener and with the fastener inserted into the slot in the substrate.

FIG. 2C is a perspective view 200C of the fully rotated socket engaged with the Christmas tree fastener. FIG. 2C illustrates the fastener inserted into the slot 202 in the substrate 201. Arrow 206 indicates the rotation of socket 205. FIG. 2C illustrates the socket 205 and fastener rotated 90° with longitudinal tabs 141A, 141B residing in a transverse orientation and transverse tabs 131A, 131B residing in longitudinal slot 202. When the transverse tabs 131A, 131B reside in slot 202, they engage the longitudinal slot walls 202 as indicated by reference numeral 207 in FIG. 2C and in FIG. 2E and prohibit further rotation of the fastener. FIG. 2D is a cross-sectional view 200D taken along the lines 2D-2D of FIG. 2C illustrating joints 220A, 220B or apexes (vertices) of the hexagonal socket 205.

Referring to FIGS. 1D, 2, 2A, 2B, 2C and 2D, tapered longitudinal tabs 141A, 141B extend from the upper plate 101 and are angled slightly downwardly with respect to shaft 204 at a slight angle. Similarly, transverse tabs 131A, 131B extend from the upper plate 101 and are angled downwardly with respect to shaft 104 at a slight angle. When the fastener is placed into slot 202 of the substrate 201, the thickness of the substrate 201 slightly exceeds the distance between the longitudinal plate 102, 152 and the ends 102A, 152A of the tapered longitudinal tabs 141A, 141B. The fastener is first positioned by placing the first portion 102 and the second portion 152 of the longitudinal head in alignment with the slot 202. The first portion 102 and the second portion 152 of the longitudinal head are then inserted in the slot with pressure applied to the fastener such that the first and second portions 102, 152 extend into and through the slot to the depth required so that the fastener can be rotated without the lower longitudinal plate engaging the rear surface of the substrate. As pressure is applied to the fastener in the downward direction, the transverse tabs 131A, 131B experience a small amount of flexion (deflection or bending). As rotation of the fastener begins the side wall portions (edges) 142, 143A of the tapered longitudinal tabs 141A, 141B proximate to shaft 104 slidingly engage the wall of the keyhole slot 202 first, and then as rotation continues sliding engagement of the side wall portions (edge) proximate the end portions (141C, 141D) of the tapered portion of the tabs 141A, 141B occurs. In this way, as rotation of the fastener continues the tapered longitudinal tabs 141A, 141B ride up on the front surface 201 of the substrate 201. Tapering of the longitudinal tabs better enables the fastener to ride up on (or, put another way, slide up on) the front surface of the substrate 201. Put another way, since the longitudinal tabs are tapered, as rotation of the fastener begins, the tabs 141A, 141B contact the wall of the slot 202 proximate shaft 104 such that the tabs ride up on the substrate in a sliding action. The substrate may be masonite, wood or plastic.

Referring to FIG. 2C, as rotation proceeds to the extent of 90° such that the tapered longitudinal tabs 141A, 141B are oriented at a right angle with respect to the slot, the transverse tabs 131A, 131B are aligned with and extend 207 slightly into slot 202 preventing further rotation of the fastener. The longitudinal tabs 141A, 141B and the longitudinal plate portions 102, 152 loosely grip the substrate 201. However, the fastener is slidable against the gripping action in the longitudinal direction of the slot 202 as indicated by reference numeral 270.

Reference numeral 207 represents the depth of insertion of the transverse tab 131A into slot 202. See FIG. 2E illustrating the depth of insertion of the transverse tabs 131A, 131B in the slot 202. FIG. 2E is a cross-sectional view 200E taken along the lines 2E-2E of FIG. 2C. Insertion of the transverse tabs 131A, 131B in the slot 202 prevents further rotation of the fastener as the edges of the transverse tabs 131A, 131B interengage the slot 202. Arrow 270 indicates sliding movement in the longitudinal direction of the slot 202 which accommodates for alignment of the fastener with an aperture or bore 402 in another (second) substrate 401. See, FIG. 2F which is a perspective view 200F of the fastener in the slot 202 with the transverse tabs 131A, 131B interengaging the walls of the slot 202 and the fastener moving within the slot according to the arrow 270.

Although the edges of the transverse tabs 131A, 131B interengage the wall of the slot 202, rotation of the fastener with sufficient torque allows the tabs to ride up and over the front surface of the substrate unlocking the fastener. To remove the fastener from the slot, the steps are reversed. Slight downward pressure is applied by the socket or by hand, and the fastener is rotated either 90° in the direction of arrow 206 or 90° counterclockwise (in the direction opposite arrow 206). In the removal process tabs 131A, 131B slidingly engage and are forced up and on top of the substrate 201.

FIG. 3 is an exploded view 300 of the hexagonal socket 205, Christmas tree fastener, and the slot 202 in the substrate 201. FIGS. 3-3F are similar to FIGS. 2-2F with the exception of the foam backing 301 attached to the rear surface of the substrate 201. As such, the description of the operation of the fastener provided in connection with FIGS. 2-2F will not be repeated here in connection with the operation of the fastener in connection with FIGS. 3-3F because it is the same. FIG. 3 illustrates foam backing 301 adhesively secured to the substrate 302. FIG. 3A is a perspective view 300A of the socket 205 engaged with the Christmas tree fastener and the fastener inserted into the slot in the substrate as previously described herein with respect to FIGS. 2-2F. FIG. 3B is a cross-sectional view 300B taken along the lines 3B-3B of FIG. 3A. Cutting edges 102C, 102D are illustrated in FIG. 3B in the position before the fastener is rotated. Once rotation of the fastener begins, cutting edges 102C, 102D separate foam 301 from the rear side of the substrate 201. Foam 301 is glued to the rear side of the substrate at the interface 302 of the foam and the substrate.

Figure 3C:
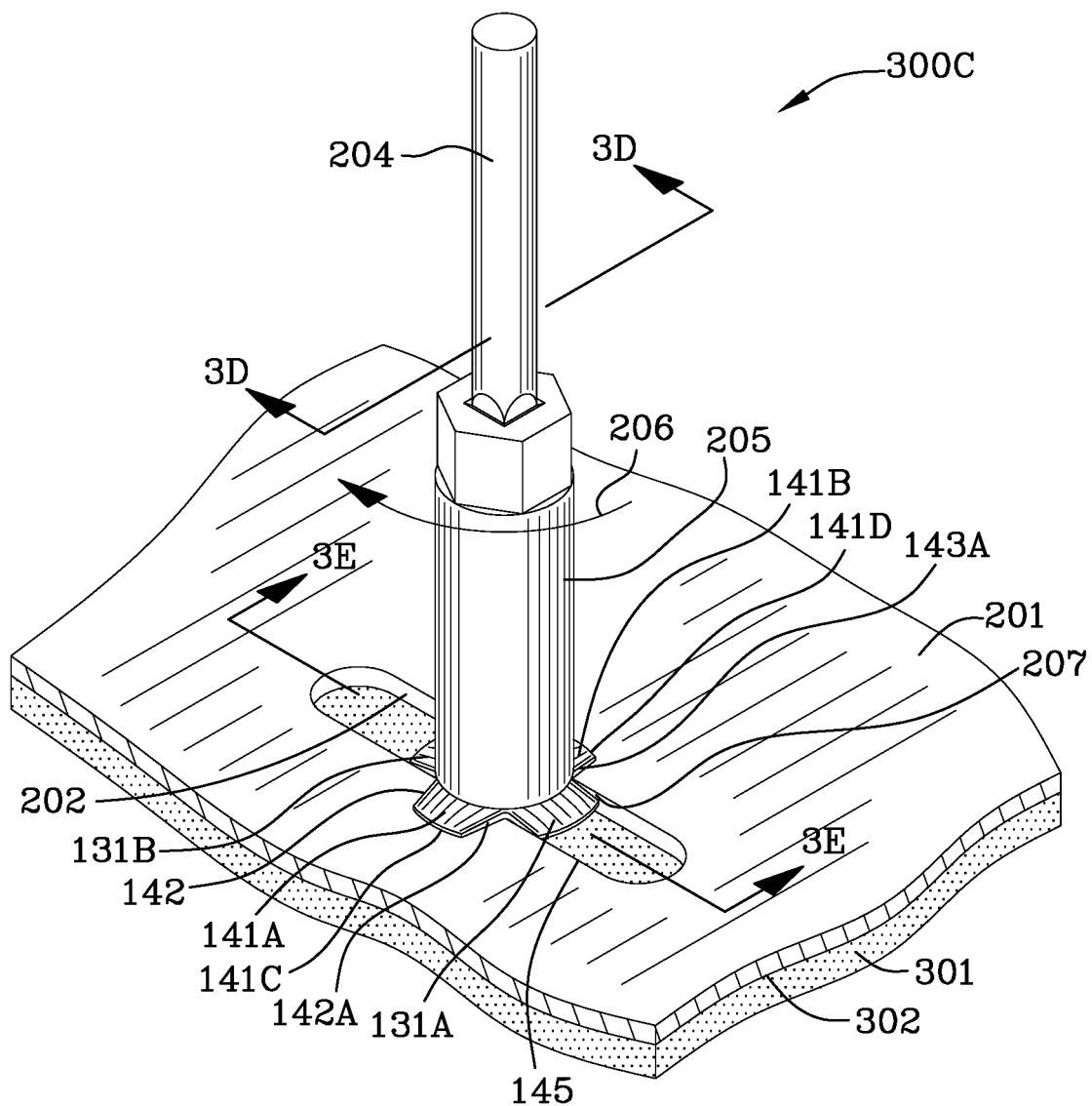
FIG. 3C is a perspective view of the rotated socket engaged with the Christmas tree fastener and with the fastener inserted into the slot in the substrate.

FIG. 3C is a perspective view 300C of the rotated socket 205 engaged with the Christmas tree fastener and with the fastener inserted into the slot in the substrate. Arrow 206 indicates the rotation of the socket. The rotation and use of the fastener as illustrated in FIGS. 3-3F is the same as the description provided herein as previously described herein in connection with FIGS. 2-2F. Transverse tabs 131A, 131B are illustrated in FIG. 3C illustrating interengagement with slot 202 as indicated by reference numeral 207. FIG. 3D is a cross-sectional view 300D taken along the lines 3D-3D of FIG. 3C and illustrates longitudinal tabs 141A, 141B rotated such that they are restrained in a transverse orientation with respect to keyhole slot 202. The fastener is restrained from movement laterally left to right as shown in FIG. 3D. However, movement along the slot 202 is possible as set forth previously herein. As illustrated in FIG. 3D, a slight clamping pressure is applied to tabs 141A, 141B and the lower longitudinal plate 102, 152 so that the fastener is movably secured to the substrate. By "movably secured" to the substrate, it is meant that the fastener is slidable along the longitudinal direction of the slot 202.

FIG. 3E is a cross-sectional view 300E taken along the lines 3E-3E of FIG. 3C. FIG. 3F is a perspective view 300F of the fastener in the slot 202 with the transverse tabs 131A, 131B interengaging the walls of the slot. Reference numerals 312, 314 indicate the interface between the substrate 201 and the foam 301 which has been cut by the cutting edges 102C, 102D of the lower longitudinal plate during rotation of the fastener.

FIG. 4 is a cross-sectional view 400 of the fastener positioned in substrate 201 for joinder with another substrate 401. FIG. 4A is a cross-sectional view 400A of the fastener and substrates 201, 401 of FIG. 4 joined together with the shaft 104 of the fastener and branches 105, 106, 109, 110, inserted into the bore 402 of the second substrate 401. Skin 406A is wrapped around foam 301 and the first substrate 201. Skin 404 is wrapped around foam 403 and second substrate 401. Foam 403 is affixed to the second substrate 401. Skin surface 406A of skin 406 meets skin surface 404A of skin 404 as illustrated in FIG. 4A. It will be noted that FIG. 4A illustrates the build-up of skins 404, 406 such that no counterbore (to accommodate for the thickness of the tabs of the upper plate) is necessary in the second substrate 401 as the combined thickness of skins 404 and 406 provide separation between the first substrate 201 and the second substrate 401. In this way the longitudinal tabs 141A, 141B and the transverse tabs 131A, 131B are housed between the first substrate 201 and the second substrate 401.

Figure 5:
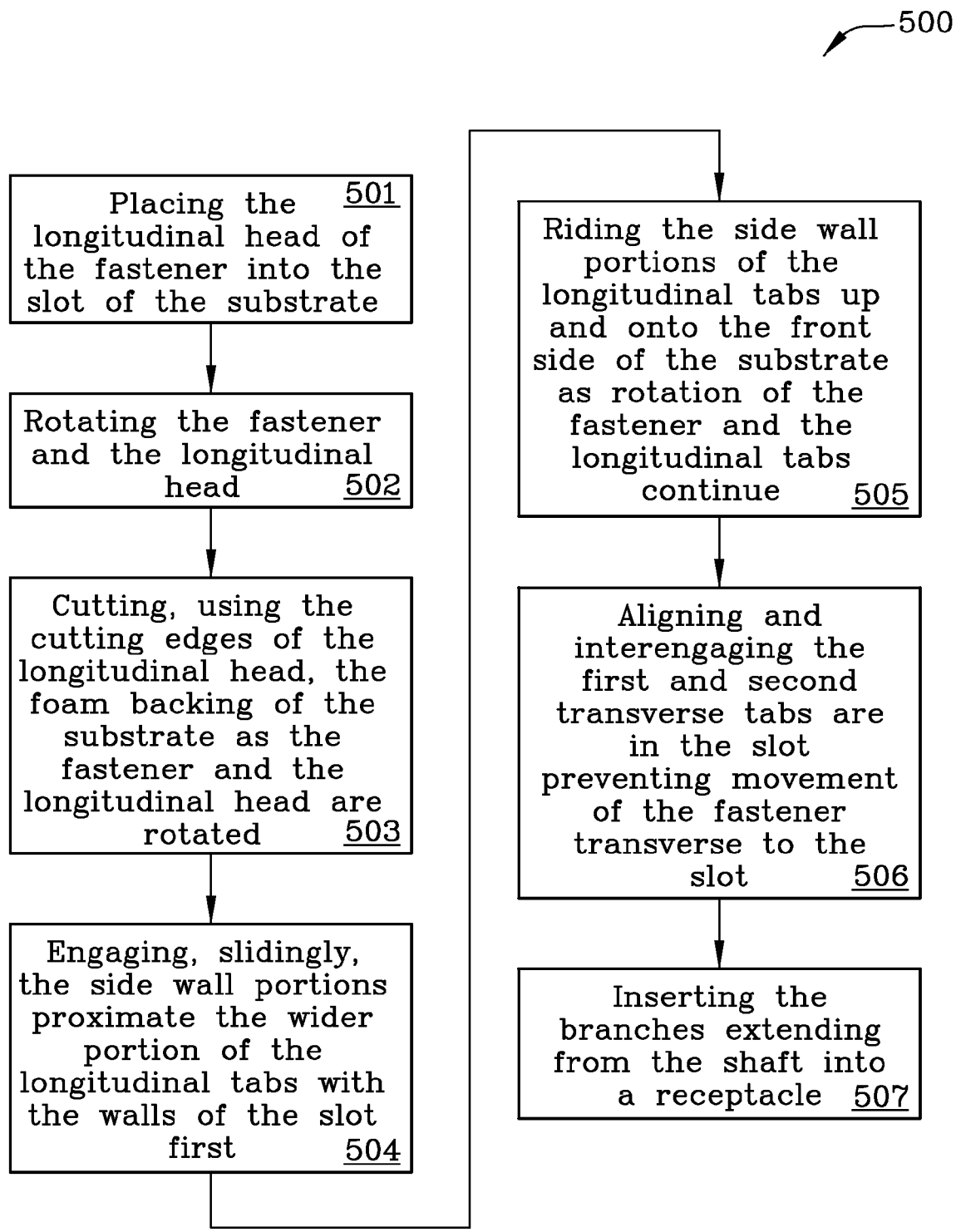
FIG. 5 is a schematic of some of the process steps for using the fastener.

FIG. 5 is a schematic 500 of some of the process steps for using the fastener. A method for using a fastener with a substrate is disclosed and claimed. The fastener includes: an upper plate having first and second longitudinal tabs and first and second transverse tabs; a longitudinal head, a shank interconnecting the upper plate and the longitudinal head; a shaft extending from the upper plate, branches extending from the shaft, the longitudinal head includes cutting edges, the first and second longitudinal tabs include side wall portions and end portions, the first and second longitudinal tabs are tapered; and, the first and second longitudinal tabs are wider near the shaft and are narrower near the end portions of the tab. The substrate includes a foam backing and a slot therein, the slot in the substrate includes a wall portion therein, the substrate includes a front side and a back side, and, the foam is affixed to the substrate.

The method comprises the following steps of: placing the longitudinal head of the fastener into the slot of the substrate-501; rotating the fastener and the longitudinal head-502; cutting, using the cutting edges of the longitudinal head, the foam backing of the substrate as the fastener and the longitudinal head are rotated-503; engaging, slidingly, the side wall portions proximate the wider portion of the longitudinal tabs with the walls of the slot first-504; riding the side wall portions of the longitudinal tabs up and onto the front side of the substrate and as rotation of the fastener and the longitudinal tabs continue-505; and, aligning and interengaging the first and second transverse tabs in the slot preventing movement of the fastener transverse to the slot-506.

Alternatively, the additional steps may include: inserting the branches extending from the shaft into a receptacle-507;

interengaging, with a hexagonal socket, the beveled edges of the first and second branches, the apex of the first and second branches and the squared edges of the third, fourth, fifth and sixth branches forming a hexagonal profile-508.

The following reference numerals are included for ease of reading this patent application.

REFERENCE NUMERALS

- 100—perspective view of the Christmas tree fastener
- 100A—perspective view of the Christmas tree fastener
- 100B—top view of the Christmas tree fastener
- 100C—hexagonal arrangement of the branches of the Christmas tree fastener
- 100D—front view of the Christmas tree fastener
- 100E—side view of the Christmas tree fastener
- 100F—cross-sectional view of the Christmas tree fastener taken along the lines 1F-1F of FIG. 1B
- 100G—cross-sectional view of the Christmas tree fastener taken along the lines 1G-1G of FIG. 1B
- 101—upper plate
- 102—first portion of longitudinal head/plate
- 102A—end of first portion of longitudinal head/plate
- 102C—cutting edge of longitudinal head/plate
- 102D—cutting edge of longitudinal head/plate
- 103—shank between the longitudinal head/plate and the upper plate
- 104—shaft
- 105—branch having angled tip portions
- 105A—first angled tip portion of the branch 105
- 105B—second angled tip portion of the branch
- 106—branch having angled tip portions
- 106A—first angled tip portion of the branch 106
- 106B—second angled tip portion of the branch 106
- 108—radius of joinder between upper plate and the shaft 104
- 109—branch
- 109A—flat end portion of branch 109
- 109C—corner of flat end portion of branch 109
- 110—branch
- 110A—flat end portion of branch 110
- 110C—flat end portion of branch 110
- 120—tapered portion 120 of shaft
- 121—top of shaft 104
- 131A—transverse tab
- 131B—transverse tab
- 141A—longitudinal tab
- 141B—longitudinal tab
- 141C—end of longitudinal tab 141A
- 141D—end of longitudinal tab 141B
- 142—edge of transverse tab 141A
- 142A—edge of transverse tab 141A
- 143—edge of tab 141B
- 143A—edge of tab 141B
- 145—lip of slot 202
- 150—transversely sloped bottom portion of the longitudinal head/plate
- 151—longitudinally sloped bottom portion of the longitudinal head/plate
- 152—second portion of longitudinal head/plate
- 152A—end of second portion of longitudinal head/plate
- 158—longitudinally sloped bottom portion of the longitudinal head/plate
- 159—branch
- 159A—flat end portion of branch 159
- 159C—corner of flat end portion of branch 159
- 160—branch
- 160A—flat end portion of branch 160
- 160C—corner of flat end portion of branch 160
- 190—schematic representation of the hexagonal socket pattern for engaging the branches of the Christmas tree branches
- 198—circumscribed circle for the hexagon
- 199—flat bottom portion of longitudinal head/plate
- 200—perspective view of socket, Christmas tree fastener, and the slot in the substrate
- 200A—perspective view of the socket engaged with the Christmas tree fastener with the fastener inserted into the slot in the substrate
- 200B—cross-sectional view taken along the lines 2B-2B of FIG. 2A
- 200C—perspective view of the rotated socket engaged with the Christmas tree fastener and with the fastener inserted into the slot in the substrate
- 200D—cross-sectional view taken along the lines 2B-2B of FIG. 2C
- 200E—cross-sectional view taken along the lines 2B-2B of FIG. 2C
- 200F—perspective view of the fastener in the slot 202 with the transverse tabs interengaging the walls of the slot
- 201—substrate
- 202—slot
- 203—arrow indicating the downward movement of the Christmas tree fastener and the socket
- 204—shaft
- 205—socket
- 206—arrow indicating movement of the socket
- 207—depth of insertion of transverse tab 131A into slot 202
- 220—inner joint of socket
- 220A—inner joint of socket
- 220B—inner joint of socket
- 270—arrow indicating possible sliding movement of the fastener in slot 202
- 300—perspective view of socket, Christmas tree fastener, and the slot in the substrate
- 300A—perspective view of the socket engaged with the Christmas tree fastener with the fastener inserted into the slot in the foam backed substrate
- 300B—cross-sectional view taken along the lines 3B-3B of FIG. 3A
- 300C—perspective view of the rotated socket engaged with the Christmas tree fastener and with the fastener inserted into the slot in the foam backed substrate
- 300D—cross-sectional view taken along the lines 3B-3B of FIG. 3C
- 300E—cross-sectional view taken along the lines 3B-3B of FIG. 3C
- 300F—perspective view of the fastener in the slot 202 with the transverse tabs interengaging the walls of the slot
- 301—foam
- 302—interface between the foam and the substrate
- 312—portion of the interface between the substrate and the foam which has been disturbed by rotating the fastener
- 314—portion of the interface between the substrate and the foam which has been disturbed by rotating the fastener
- 400—schematic illustration of the fastener positioned in a first substrate to be joined to a second substrate
- 400A—schematic illustration of the fastener positioned in a first substrate joined with a second substrate
- 401—second substrate
- 402—bore in second substrate 401
- 403—foam affixed to second substrate 401 by adhesive or otherwise
- 404—skin surface
- 404A—skin 406—skin surface
406A—skin
500—method of using the fastener
501—placing the longitudinal head of the fastener into the slot of the substrate-501; rotating the fastener and the longitudinal head
502—rotating the fastener and the longitudinal head
503—cutting, using the cutting edges of the longitudinal head, the foam backing of the substrate as the fastener and the longitudinal head are rotated
504—engaging, slidingly, the side wall portions proximate the wider portion of the longitudinal tabs with the walls of the slot first
505—riding the side wall portions of the longitudinal tabs up and onto the front side of the substrate as rotation of the fastener and the longitudinal tabs continue
506—aligning and depressing the first and second transverse tabs are in the slot preventing movement of the fastener transverse to the slot
507—inserting the branches extending from the shaft into a receptacle
508—interengaging, with a hexagonal socket, the beveled edges of the first and second branches, the apex of the first and second branches and the squared edges of the third, fourth, fifth and sixth branches forming a hexagonal profile.

Those skilled in the art will readily recognize that the invention has been set forth by way of example only and that changes may be made to the examples set forth without departing from the spirit and the scope of the appended claims. For instance, it is specifically envisioned that sockets other than hexagonal sockets may be used and that the corresponding fastener shaft and branches would reciprocally match the socket to be used.

The invention claimed is:

1. A fastener in combination with a substrate, said substrate includes a foam backing and a slot therein, comprising:
   said substrate includes a front side and a back side;
   said foam affixed to said substrate;
   an upper plate having first and second longitudinal tabs and first and second transverse tabs;
   a longitudinal head;
   a shank interconnecting said upper plate and said longitudinal head;
   a shaft extending from said upper plate;
   branches extending from said shaft;
   said longitudinal head includes cutting edges;
   said fastener and said longitudinal head of said fastener being rotatable, said longitudinal head resides in alignment with said slot of said substrate; and,
   said cutting edges of said longitudinal head cut said foam backing of said substrate as said fastener and said longitudinal head of said fastener are rotated.

2. A fastener in combination with a substrate, said substrate includes a foam backing and a slot therein, as claimed in claim 1, wherein:
   said slot in said substrate includes a wall portion therein;
   said first and second longitudinal tabs of said upper plate include side wall portions and end portions;
   said first and second longitudinal tabs are tapered, said first and second longitudinal tabs are wider near said shaft and are narrower near said end portions;
   said side wall portions near said wider portion of said longitudinal tabs slidingly engage said walls of said slot first and ride up on said front side of said substrate and as rotation of said fastener and said longitudinal tabs continues, said first and second transverse tabs are aligned and depressed in said slot preventing movement of said fastener transverse to said slot.

3. A fastener in combination with a substrate as claimed in claim 1, further comprising:
   said branches arranged in a row about said shaft.

4. A fastener in combination with a substrate as claimed in claim 3, further comprising:
   a plurality of rows of said branches arranged about said shaft.

5. A fastener in combination with a substrate, said substrate includes a foam backing and a slot therein, comprising:
   said substrate includes a front side and a back side;
   said foam affixed to said substrate;
   an upper plate having first and second resilient longitudinal tabs and first and second resilient transverse tabs;
   said first and second resilient longitudinal tabs include sidewall portions and end portions;
   said first and second resilient longitudinal tabs are wider near said shaft and are narrower near said end portions;
   said first and second resilient transverse tabs include end portions;
   a longitudinal head;
   a shank interconnecting said upper plate and said longitudinal head;
   a shaft extending from said upper plate;
   said first and second resilient longitudinal tabs are angled downwardly from said shaft to said end portions;
   said first and second resilient transverse tabs are angled downwardly from said shaft to said end portions;
   branches extending from said shaft;
   said longitudinal head includes cutting edges;
   said slot in said substrate includes a wall portion;
   said fastener, said first and second resilient longitudinal tabs, said first and second resilient transverse tabs, and said longitudinal head of said fastener being rotatable;
   said longitudinal head resides in alignment with said slot of said substrate before rotation, said first and second resilient longitudinal tabs reside in alignment with said slot of said substrate before rotation, and said first and second transverse tabs reside in engagement with said front side of said substrate before rotation;
   said cutting edges of said longitudinal head cut said foam backing of said substrate as said fastener and said longitudinal head of said fastener are rotated, said longitudinal head of said fastener being depressed in said slot enabling rotation of said fastener and said longitudinal head without engaging said wall portion of said slot;
   said side wall portions of said first and second longitudinal tabs near said wider portion of said longitudinal tabs slidingly engage said walls of said slot of said substrate first and ride up on said front side of said substrate as rotation of said fastener begins, said first and second transverse tabs slidingly engage said front surface of said substrate as rotation of said fastener begins; and,
   as rotation of said fastener, said resilient longitudinal tabs, and said resilient transverse tabs continues, said first and second resilient transverse tabs are aligned with and depressed in said slot preventing movement of said fastener transverse to said slot and said first and second resilient longitudinal tabs engage said front surface of said substrate.

* * * * *